April 21, 1925.                                                                          1,534,031
F. C. FRARY

ELECTROLYTIC PRODUCTION OF ALUMINUM

Filed April 10, 1924

```
┌─────────────────────────────┐
│ Producing alumina in the    │
│ molten state, and allowing  │
│ it to solidify.             │
└─────────────┬───────────────┘
              │
┌─────────────┴───────────────┐
│ Comminuting the alumina,    │
│ solidified from the molten  │
│ state, to 85 mesh, approxi- │
│ mately.                     │
└─────────────┬───────────────┘
              │
┌─────────────┴───────────────┐
│ Dissolving the comminuted   │
│ alumina in a fused cryo-    │
│ lite bath.                  │
└─────────────┬───────────────┘
              │
┌─────────────┴───────────────┐
│ Electrolyzing the dissolved │
│ alumina, with deposition    │
│ of metallic aluminum at     │
│ the cathode.                │
└─────────────────────────────┘
```

INVENTOR.
Francis C. Frary.
BY
Cooper, Kerr & Dunham
ATTORNEYS

Patented Apr. 21, 1925.

1,534,031

UNITED STATES PATENT OFFICE.

FRANCIS C. FRARY, OF OAKMONT, PENNSYLVANIA, ASSIGNOR TO ALUMINUM COMPANY OF AMERICA, OF PITTSBURGH, PENNSYLVANIA, A CORPORATION OF PENNSYLVANIA.

ELECTROLYTIC PRODUCTION OF ALUMINUM.

Application filed April 10, 1924. Serial No. 705,459.

*To all whom it may concern:*

Be it known that I, FRANCIS C. FRARY, a citizen of the United States of America, residing at Oakmont, in the county of Allegheny and State of Pennsylvania, have invented certain new and useful Improvements in Electrolytic Production of Aluminum, of which the following is a full, clear, and exact description.

This invention relates to the production of metallic aluminum by the electrolytic reduction of alumina (aluminum oxid, $Al_2O_3$), as in the so-called Hall process now in extensive use in the United States and other countries. In processes of this character the alumina is reduced in a molten bath or electrolyte consisting essentially of aluminum and sodium fluorids, and the purity of the metal obtained depends, among other things, upon the purity of the bath and of the alumina. It is therefore impossible to use crude alumina if a commercially pure product is desired, and the universal practice has been to obtain the necessary pure alumina by chemical treatment of the bauxite, producing aluminum hydrate, which is then dehydrated by calcination. Attempts have been made, some of them with great care, to use in the Hall process alumina obtained by reduction of the other oxids, as for example oxids of iron, titanium, and silicon, usually found associated with aluminous compounds in nature, and the methods and apparatus described in United States patents of Charles M. Hall, Nos. 677,207, 677,208, 677,209, and 706,553, were devised for producing alumina in the manner indicated. A product apparently of sufficient purity was obtained, but when used in the electrolytic pots the electrolytic reduction process speedily became unmanageable to such an extent that the pots had to be shut down. The chief observable effect was a pronounced rise of temperature, soon reaching a point at which the cell became inoperable. The cause of the trouble was not known, but it was believed to be the presence of small amounts of titanium in the alumina, which were thought to cause the bath to thicken and become sticky.

The production of alumina by electrothermal elimination of impurities found associated therewith in the natural crude materials offers, in theory, marked advantages over the chemical method heretofore employed; and recent inventions (as for example the improvements described in the copending application of William Hoopes, Junius D. Edwards and myself, Serial No. 608,283, filed December 21, 1922) having made the electrothermal production of alumina practical on a commercial scale, I have been led to a study of the problem of utilizing such alumina in the Hall process.

Not accepting the prior belief that the trouble was due to the presence of titanium in small amounts I gave consideration first to the condition of the alumina produced by the electrothermal reduction method, in comparison with that obtained by the customary chemical method, and observed that the former, produced in the molten state and allowed to solidify, appeared to have a higher density than alumina produced by the chemical process. If both are of the same purity, they both have the same density when fused, namely, about 3.84 grams per cc., which is considerably higher than that of either molten aluminum or the so-called cryolite bath commonly used in the Hall process, and after further investigation I arrived at the belief that the apparently lower density of the alumina produced by the chemical method is due to the physical nature of the particles. These appear to be porous, due probably to the driving off of water of crystallization in calcining the aluminum hydrate, thereby leaving the particles porous to an extent corresponding, at least roughly, to the amount of water driven off. It also occurred to me that the dissolving of alumina in the molten cryolite bath is not as rapid as had been believed and hence that addition of the alumina particles to the bath was not always followed by immediate solution thereof. Also, the particles might possibly remain undissolved long enough for some of them to coalesce into larger particles or bodies. In either case the time required for solution might permit undissolved particles to sink through the bath to the underlying molten cathode aluminum and thence on down through the aluminum to the bottom of the cell. If such were the case, the resulting accumulation of alumina below the aluminum would increase the resistance to flow of current between the aluminum and the carbon bottom of the cell. This would not only raise the temperature of the cell contents but might also cause the formation of aluminum carbid, which would contaminate the bath and otherwise make the management of the cell difficult.

Assuming the foregoing to be correct, it was thought that if the solution of the alumina particles could be hastened or if the particles could be suspended in the fused cryolite for a longer period, so that solution would take place before they could sink to the aluminum layer below, the trouble previously encountered would be largely decreased if not entirely eliminated; and upon experiment I found that such is the case and that the unavoidable or difficultly avoidable presence of small amounts of the usual impurities, namely, iron and titanium oxids and silica, or any of them, is not the cause of the trouble.

In the course of my experiments I found that if alumina solidified from the molten state, and containing the impurities mentioned, be ground so fine as to permit all of the particles to pass through a screen having approximately 85 meshes to the linear inch, it can be used in the Hall process. Using particles of such fineness the proper operation of the cell is not interfered with, the temperature can be maintained within the required limits, and no material formation of aluminum carbid is observed. If desired the finely ground alumina can be mixed with more or less of the ordinary calcined alumina. The advantage of this course is in the direction of decreasing the concentration of impurities in the bath and consequent deposition thereof at the cathode.

The complete method of producing aluminum in the preferred way by the Hall process, from alumina obtained in the molten state (for example by electrothermal reduction or removal of associated impurities) is illustrated in the manner of a flow sheet in the accompanying drawing. The alumina may be obtained from bauxite or other naturally occurring aluminous material by the method described in the above mentioned application of William Hoopes, Junius D. Edwards and myself, or by the method and apparatus described in the above mentioned patents of Charles M. Hall. The alumina can be ground or otherwise comminuted or divided by any means, as for example a ball mill. The electrolysis can be carried out in the usual way in a Hall pot or cell of the usual type, using carbon anodes.

The grinding of the alumina is preferably carried far enough to insure substantially all the particles being fine enough to pass through an 85-mesh screen, or one not much coarser. In any case, the ground or comminuted alumina must be fine enough to keep it suspended under the conditions of ebullition and circulation obtaining in the electrolyte, so that the particles will dissolve in the bath before they have had time to sink to the bottom of the pot. The agitation and circulation of the cell contents are due to the evolution of carbon monoxid or dioxid at the carbon anodes and to the electromagnetic effects of the field, produced (as explained, for example, in the copending application of William Hoopes, Junius D. Edwards and myself, Serial No. 608,284, filed December 21, 1922) by the current in the busbars and other adjacent parts of the external circuit, upon the electrolyte and aluminum which, being molten, are in effect composed of movable conductors. As these factors vary it may be possible to use material considerably coarser than 85-mesh, or it may be necessary to grind the material still finer, as will be readily understood. I do not mean to say that no portion whatever can be allowed to sink to the bottom of the pot. A small amount ordinarily does no great harm, the resulting rise of temperature, if any, being relatively too slight to seriously affect the operation of the cell.

As the electrolysis proceeds, additional comminuted alumina is supplied to the cell from time to time or more or less continuously, preferably in amounts sufficient to prevent impoverishment of the bath.

I claim:

1. In a process of producing metallic aluminum by electrolytic reduction of alumina in a fused bath containing sodium and aluminum fluorids, the steps comprising finely dividing alumina, solidified from the molten state, into particles of a size enabling the same to remain in suspension in the fused bath until dissolved therein, supplying the finely divided alumina to the bath for solution therein, and electrolyzing the same.

2. In a process of producing metallic aluminum by electrolytic reduction of alumina in a fused bath containing sodium and aluminum fluorids, the steps comprising finely dividing previously fused and solidified alumina into particles adapted to be dissolved in the bath before they have time to sink to the bottom of the cell, supplying the finely divided alumina to the bath for solution therein, and electrolyzing the same.

3. In a process of producing metallic aluminum by electrolytic reduction of alumina in a fused bath containing sodium and aluminum fluorids, the steps comprising dividing previously fused and solidified alumina to particles of approximately 85-mesh size whereby the particles of alumina can remain in suspension in the bath until dissolved therein, supplying the divided alumina to the bath for solution therein, and electrolyzing the same.

4. In a process of producing metallic aluminum by electrolytic reduction of previously fused and solidified alumina supplied to and dissolved in a fused bath containing sodium and aluminum fluorids, the method of preventing accumulation of alumina or other aluminous compound below the cathode, comprising supplying to the bath the previously fused and solidified alumina in the form of particles of a size adapting them to remain suspended in the bath until dissolved under normal conditions of circulation of the bath.

5. In a process of producing metallic aluminum by electrolytic reduction of previously fused and solidified alumina supplied to and dissolved in a fused bath containing sodium and aluminum fluorids, the method of preventing accumulation of alumina or other aluminous compound below the cathode, comprising supplying to the bath the previously fused and solidified alumina in the form of particles small enough to pass through a screen of about 85-mesh, and maintaining a circulation of the bath adequate to keep the alumina particles in suspension therein until dissolved.

In testimony whereof I hereto affix my signature.

FRANCIS C. FRARY.